Sept. 22, 1953 W. P. LOHMAR 2,652,999
FISHING POLE HOLDER
Filed Dec. 17, 1951
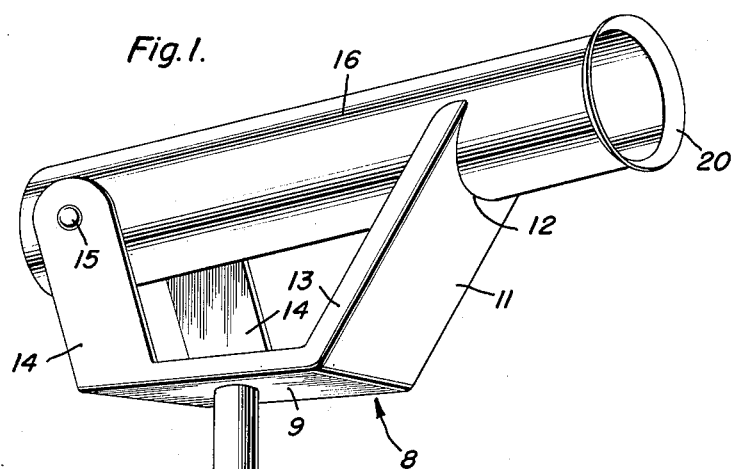
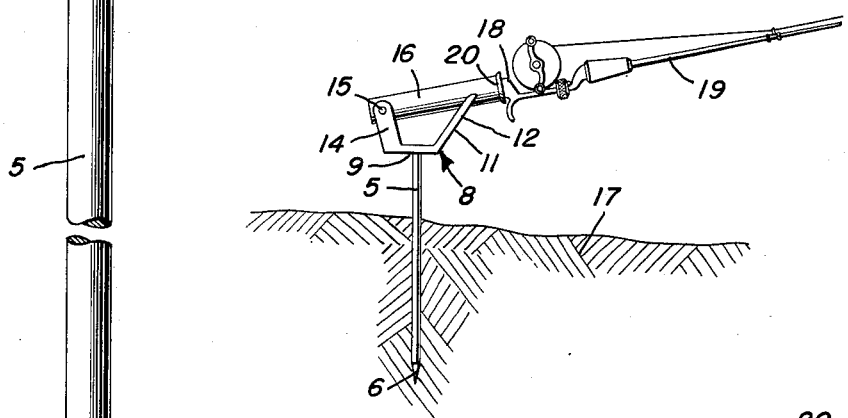
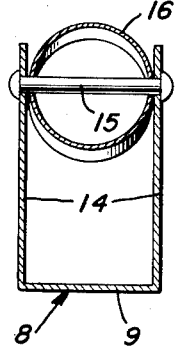
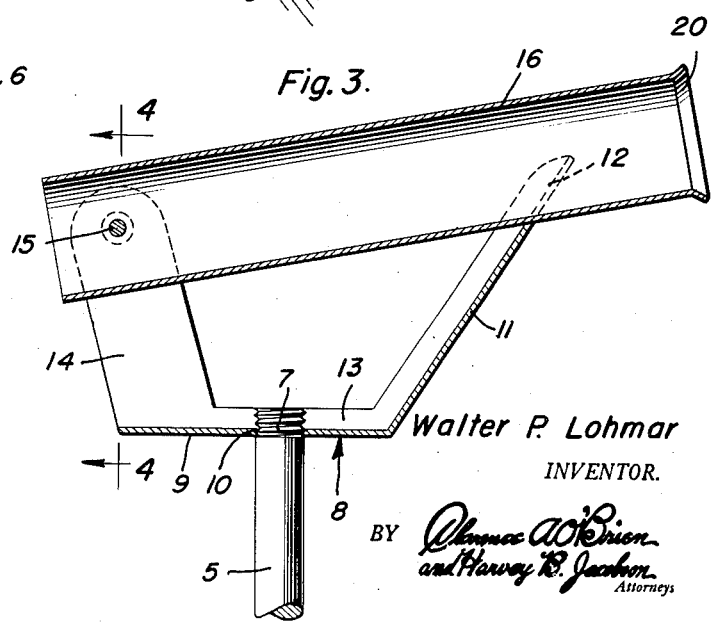
Walter P. Lohmar
INVENTOR.

Patented Sept. 22, 1953

2,652,999

UNITED STATES PATENT OFFICE 2,652,999

FISHING POLE HOLDER

Walter P. Lohmar, Elgin, Ill.

Application December 17, 1951, Serial No. 262,051

3 Claims. (Cl. 248—42)

The present invention relates to new and useful improvements in fishing pole holders and has for its primary object to provide, in a manner as hereinafter set forth, a device of this character which is adapted to firmly support a fishing pole at the desired angle on the bank of a body of water.

Another very important object of the invention is to provide a holder of the aforementioned character embodying a novel construction and arrangement whereby the pole may be readily swung upwardly to facilitate baiting the hook or for any other purpose.

Other objects of the invention are to provide a fishing pole holder of the character described which will be comparatively simple in construction, strong, durable, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a perspective view of a fishing pole holder constructed in accordance with the present invention.

Figure 2 is a side elevational view, showing the device in use.

Figure 3 is a view in vertical longitudinal section through the device.

Figure 4 is a view in transverse section, taken substantially on the line 4—4 of Figure 3.

Referring now to the drawing in detail, it will be seen that the embodiment of the invention which has been illustrated comprises a metallic spike 5 of suitable length and diameter which is adapted to be driven into the ground in the manner shown to advantage in Figure 2 of the drawing, said spike including a pointed lower end 6. The spike 5 further includes a threaded upper end portion 7.

Removably mounted on the upper end portion of the spike 5 is a metallic bracket which is designated generally by reference numeral 8. The bracket 8 includes a base portion or plate 9 having an opening 10 therein (see Figure 3) into which the upper end portion 7 of the spike 5 is threaded. The bracket 8 further includes an upwardly and outwardly inclined arm 11 on one end of the base portion 9, said arm having an arcuate recess 12 in its free end portion.

The bracket 8 is in the form of a channel member, said bracket including integral side flanges 13 for strength. Rising from the side flanges 13 at the other end of the base portion or plate 9 of the bracket 8 is a pair of apertured ears 14. Extending between the ears 14 is a pin or shaft 15.

A pivoted tube or barrel 16 has one end portion journaled on the pin 15 for swinging movement in a vertical plane. The other end portion of the tube 16 is adapted to seat in the recess 12 of the arm 11 in a manner to be supported thereby. It will be noted that the construction and arrangement is such that the arm 11 supports the tube 16 in an upwardly inclined position from the pin 15.

It is thought that the manner in which the device is used will be readily apparent from a consideration of the foregoing. Briefly, the spike 5 is forced into the ground, as at 17, a sufficient distance to firmly support the holder in an upright position. The tube 16 is for the reception for the usual handle 18 of a conventional fishing rod or pole 19. To facilitate insertion of the handle 18, the free end portion of the tube 16 is flared, as at 20. When it is desired to lift the line out of the water for any reason the rod or pole 19 may be readily swung upwardly without the necessity of removing the handle 18 from the tube 16. The pin 15 also functions as a stop for the handle 18 in the tube 16.

It is believed that the many advantages of a fishing pole holder constructed in accordance with the present invention will be readily understood and although a preferred embodiment of the device is as illustrated and described, it is to be understood that changes in the details of construction may be resorted to which will fall within the scope of the invention as claimed.

Having described the invention, what is claimed as new is:

1. A fishing pole holder of the character described comprising a supporting spike, a removable bracket threadedly mounted on the upper end portion of said spike, said bracket including an upstanding arm having an arcuate recess in its free end portion, and a tube, for the reception of the handle of a fishing pole, pivotally mounted on the bracket and engageable by gravity in the recess for supporting the pole.

2. A fishing pole holder of the character described comprising a supporting spike, a bracket mounted on said spike, said bracket including a base portion secured to the spike, an upstanding arm on one end of the base portion having a recess in its free end portion, a pair of upstanding ears on the other end portion of said base portion, and a tube, for the reception of the handle of a fishing pole, having one end portion pivotally secured between the ears, the free end portion of said tube being engageable by gravity in the recess in the arm.

3. A fishing pole holder of the character described comprising a supporting spike, a bracket removably mounted on the upper end portion of said spike, said bracket including an elongated base portion threadedly mounted on the spike, an upwardly and outwardly inclined arm integral with one end of the base portion and having an arcuate recess in its free end portion, upstanding side flanges on the base portion and arm, upstanding ears integral with the other end portion of the base portion, a pin extending between said ears, and a tube, for the reception of the handle of a fishing pole, having one end portion journaled on said pin, the free end portion of said tube being engageable by gravity in the recess and adapted to be supported by the arm at an upward inclination from the pin.

WALTER P. LOHMAR.

References Cited in the file of this patent

UNITED STATES PATENTS

| Number | Name | Date |
| --- | --- | --- |
| 2,199,034 | Witczak | Apr. 30, 1940 |
| 2,243,388 | Magyarosi | May 27, 1941 |
| 2,312,957 | Cannon | Mar. 2, 1943 |
| 2,466,166 | Fischer | Apr. 5, 1949 |
| 2,523,356 | Cherry | Sept. 26, 1950 |